United States Patent
Wittenberg et al.

(10) Patent No.: US 7,304,619 B2
(45) Date of Patent: Dec. 4, 2007

(54) METHOD AND APPARATUS FOR CONTROLLABLY COMPENSATING FOR DISTORTIONS IN A LASER PROJECTION DISPLAY

(75) Inventors: Carl Wittenberg, Water Mill, NY (US); Paul Dvorkis, East Setauket, NY (US); Ron Goldman, Cold Spring Harbor, NY (US); Joseph Katz, Stony Brook, NY (US); Narayan Nambudiri, Kings Park, NY (US); Miklos Stern, Woodmere, NY (US); Chinh Tan, Setauket, NY (US); Frederick F. Wood, Medford, NY (US); Dmitriy Yavid, Stony Brook, NY (US)

(73) Assignee: Symbol Technologies, Inc., Holtsville, NY (US)

(*) Notice: Subject to any disclaimer, the term of this patent is extended or adjusted under 35 U.S.C. 154(b) by 315 days.

(21) Appl. No.: 10/837,045

(22) Filed: Apr. 30, 2004

(65) Prior Publication Data

US 2005/0279922 A1    Dec. 22, 2005

(51) Int. Cl.
*G09G 5/00* (2006.01)
(52) U.S. Cl. .......................... 345/5; 359/201
(58) Field of Classification Search .................. 345/5, 345/7; 347/225, 250, 251, 256; 359/196, 359/201, 202, 204, 212–214, 223; 348/744, 348/750

See application file for complete search history.

(56) References Cited

U.S. PATENT DOCUMENTS

| | | | |
|---|---|---|---|
| 5,029,975 A | 7/1991 | Pease | 350/96.27 |
| 5,311,321 A | 5/1994 | Crowley | 348/760 |
| 5,430,509 A * | 7/1995 | Kobayashi | 351/221 |
| 5,614,961 A | 3/1997 | Gibeau et al. | 348/750 |
| 5,715,021 A | 2/1998 | Gibeau et al. | 348/750 |
| 5,920,361 A | 7/1999 | Gibeau et al. | 348/750 |
| 6,018,408 A | 1/2000 | Hong | 359/201 |
| 6,091,461 A * | 7/2000 | Bardmesser | 348/744 |
| 6,140,979 A | 10/2000 | Gerhard et al. | 345/7 |
| 6,246,504 B1 * | 6/2001 | Hagelin et al. | 359/212 |
| 6,304,237 B1 | 10/2001 | Karakawa | 345/84 |
| 6,489,934 B1 | 12/2002 | Klausner | 345/1.1 |
| 6,698,900 B1 * | 3/2004 | Young et al. | 353/79 |
| 2002/0024495 A1 | 2/2002 | Lippert et al. | 345/98 |
| 2002/0024708 A1 | 2/2002 | Lewis et al. | 359/197 |
| 2005/0017924 A1* | 1/2005 | Utt et al. | 345/32 |

FOREIGN PATENT DOCUMENTS

| WO | WO 03/005733 A1 | 1/2003 |
|---|---|---|
| WO | WO 2004/064410 A1 | 7/2004 |

OTHER PUBLICATIONS

International PCT Search Report PCT/US2004/043188 dated Dec. 12, 2004.

* cited by examiner

*Primary Examiner*—Amr A. Awad
*Assistant Examiner*—Tom V Sheng
(74) *Attorney, Agent, or Firm*—Kirschstein, et al.

(57) ABSTRACT

A method and apparatus are provided to controllably compensate for distortions in an image produced by an LPD, where the distortion arises from the shape and/or angle of the viewing surface relative to the LPD. For example, the LPD can determine the angle of the viewing surface relative to the LPD and then adjust the horizontal and vertical scan mechanisms to return the image to its original configuration, such as rectangular.

14 Claims, 9 Drawing Sheets

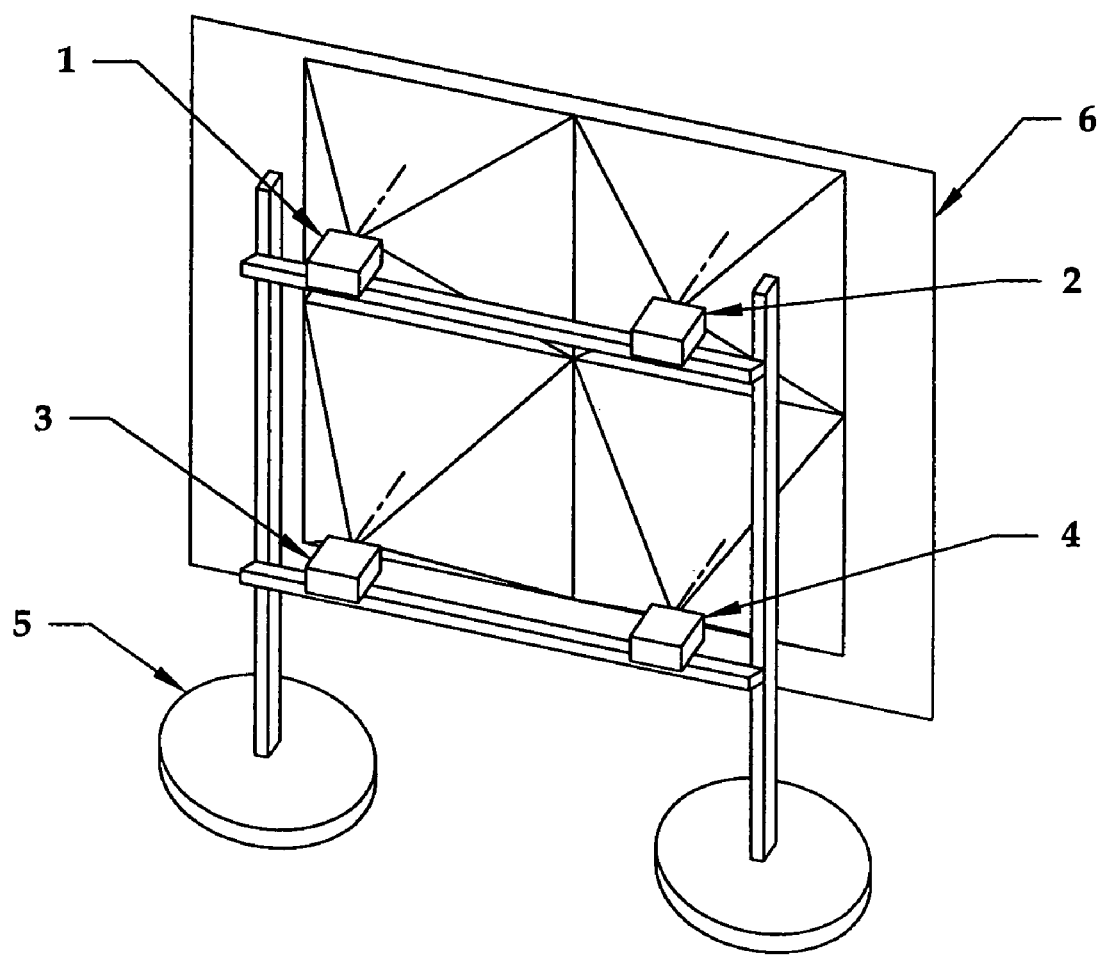
FIG. 6
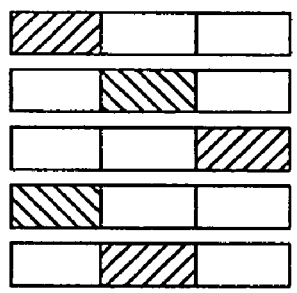 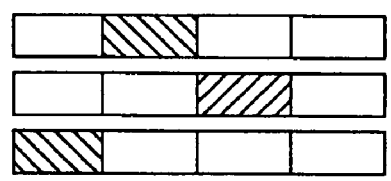
FIG. 7A          FIG. 7B

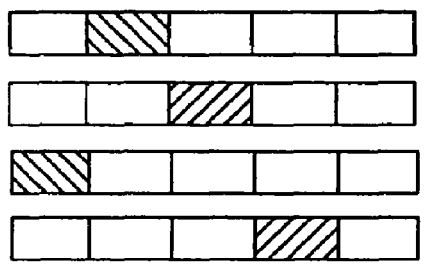
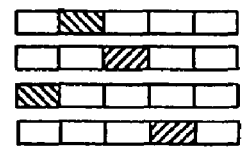
FIG. 8A　　　　FIG. 8B
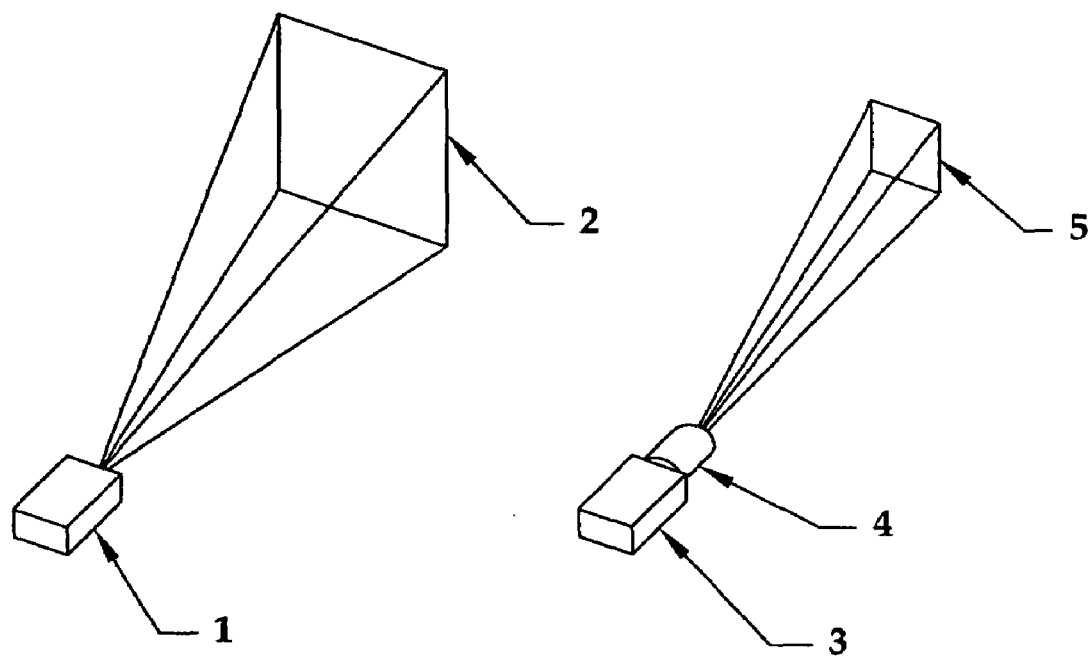
FIG. 9A　　　　FIG. 9B

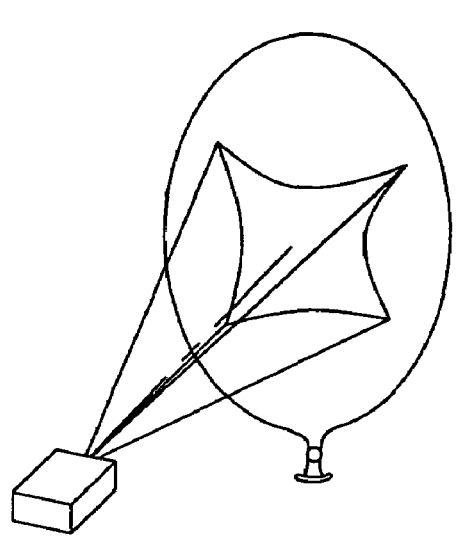
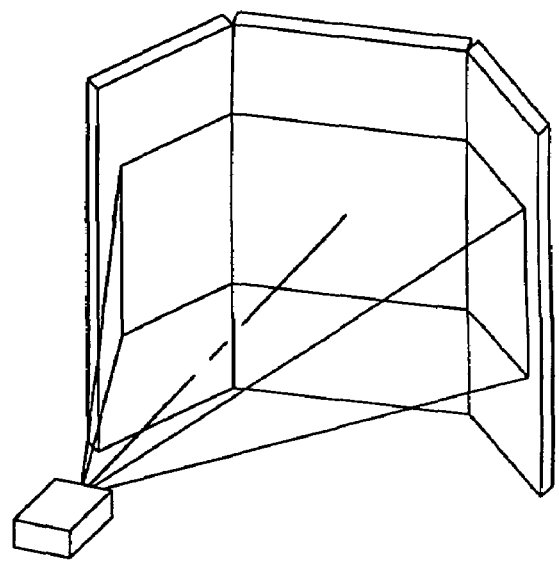
FIG. 12A          FIG. 12B
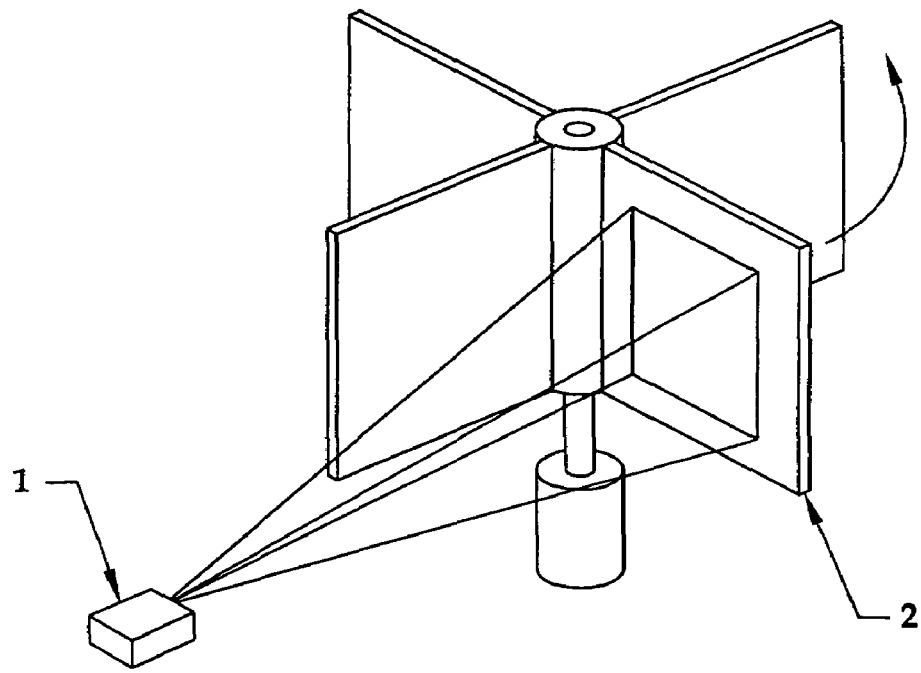
FIG. 13

FIG. 14
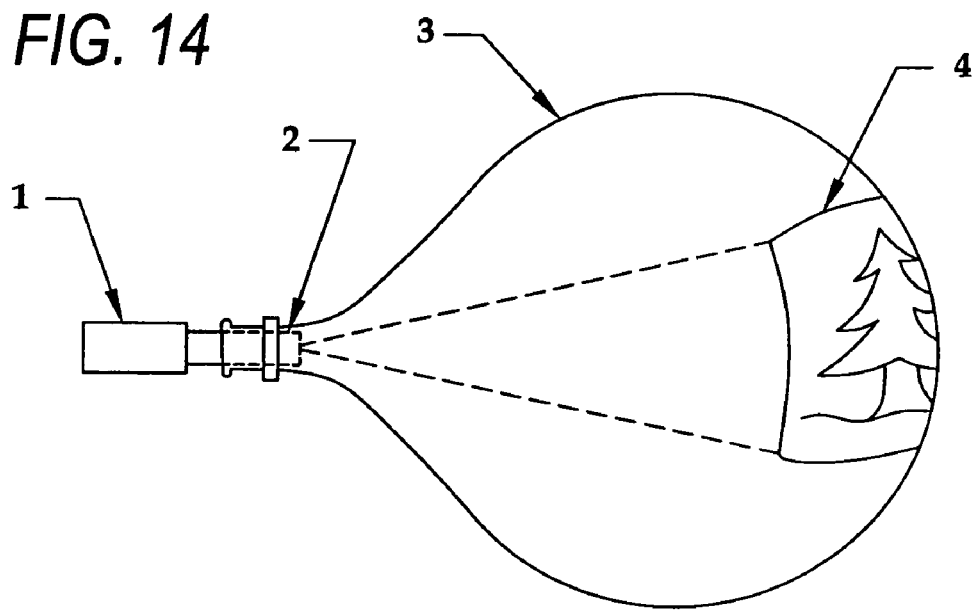
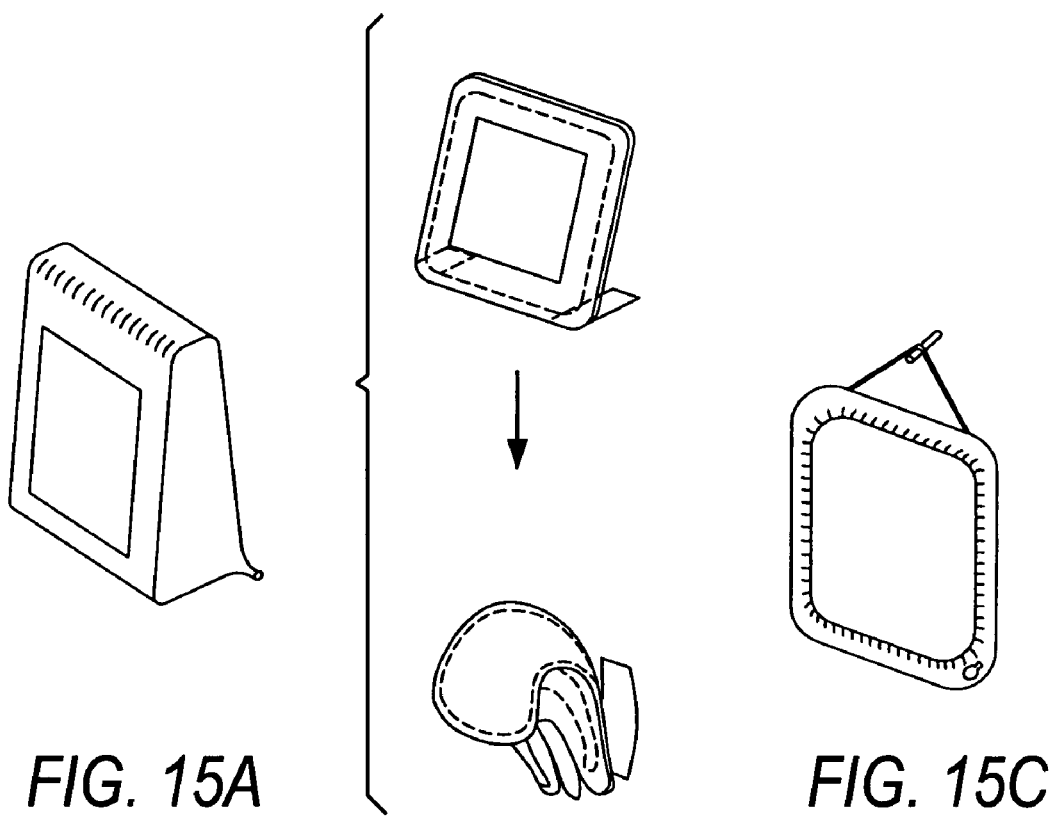
FIG. 15A
FIG. 15B
FIG. 15C

METHOD AND APPARATUS FOR CONTROLLABLY COMPENSATING FOR DISTORTIONS IN A LASER PROJECTION DISPLAY

BACKGROUND OF THE INVENTION

1. Field of the Invention

This invention relates generally to electronic displays, and, more particularly, to a laser projection display that compensates for distorted images in a laser projection display.

2. Description of the Related Art

In the field of image projection, any of a variety of distortions may occur in the projected image owing at least in part to the shape and angle of the viewing surface relative to the angle at which the image is projected. For example, if a projector is placed at an angle relative to the viewing screen, then the image will have a keystone shape, as opposed to its conventional rectangular configuration. Similarly, a rectangular image projected onto a curved surface will also be distorted. Heretofore, the problem has been sufficiently complex that no proposed solution has been successful at restoring the image to its desired rectangular configuration without a loss of image resolution and without a bulky and complex optical system.

The present invention is directed to overcoming, or at least reducing, the effects of one or more of the problems set forth above.

SUMMARY OF THE INVENTION

In one aspect of the instant invention, a method is provided for controlling a laser. The method comprises determining a characteristic of a surface onto which an image is to be projected by the laser; and projecting laser light onto the viewing surface while controlling one or more aspects of the laser using the determined characteristic of the viewing surface.

BRIEF DESCRIPTION OF THE DRAWINGS

The invention may be understood by reference to the following description taken in conjunction with the accompanying drawings, in which like reference numerals identify like elements, and in which:

FIG. 6 depicts one embodiment of a plurality of LPDs arranged to produce a tiled image;

FIGS. 7A-7B depict alternative embodiments of an arrangement of pixels projected by an LPD;

FIGS. 8A-8B depict alternative embodiments of an arrangement of pixels projected by an LPD;

FIGS. 9A-9B depict alternative embodiments of an LPD configured to produce a variable size image;

FIG. 12A-12B depict alternative embodiments of complex shaped viewing surfaces;

FIG. 13 depicts one embodiment of a rotatable viewing surface;

FIG. 14 depicts one embodiment of an LPD arranged to project a back-lit image on an inner surface of a balloon;

FIGS. 15A-15C depict alternative embodiments of an expandable viewing surface.

Figure 1:
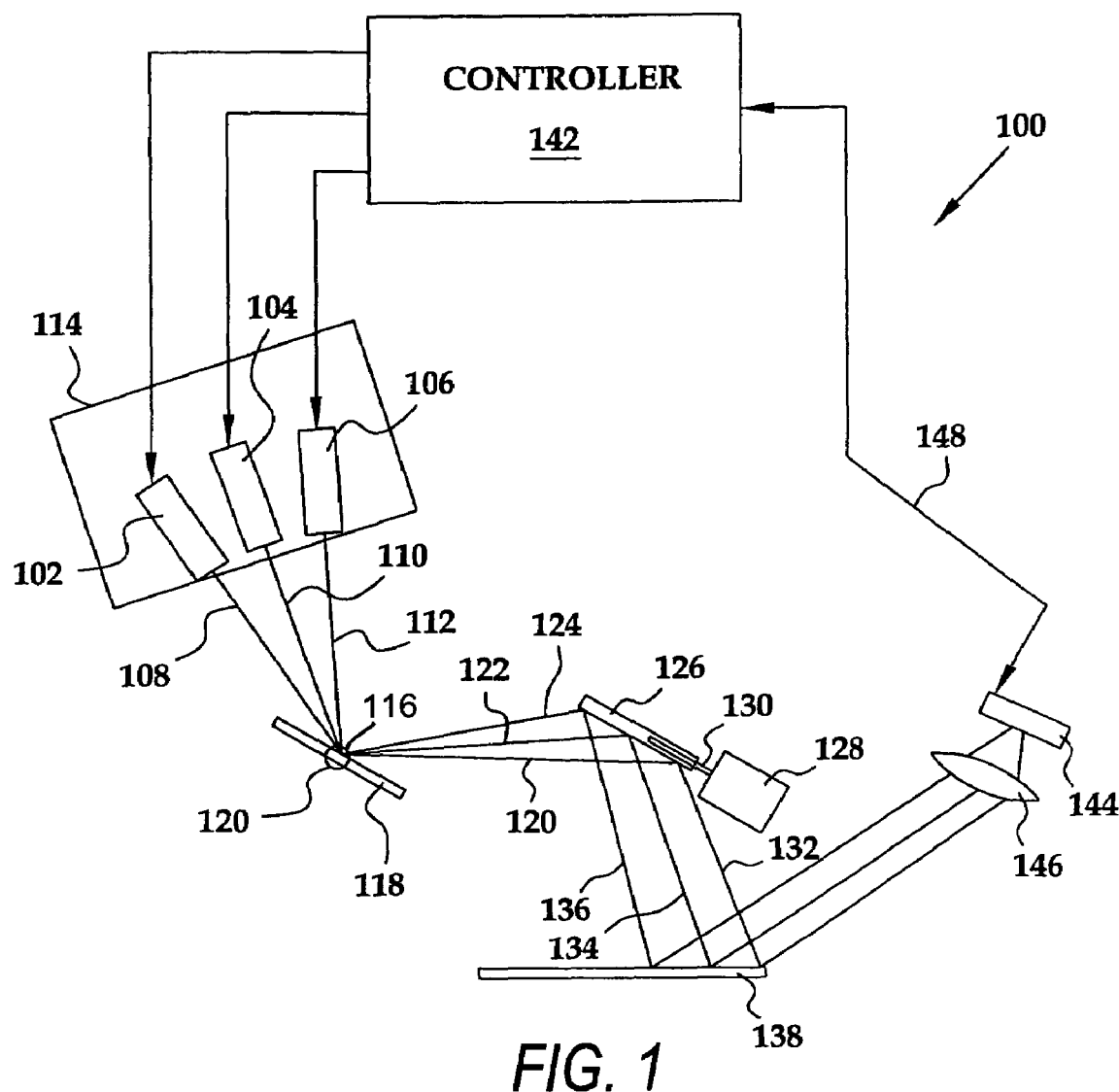
FIG. 1 is a stylistic block diagram of a top level view of one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In the illustrated embodiment, the first scanning mirror 118 oscillates on an axis 120 at a relatively high rate (e.g., about 20-30 KHz). Rotation or oscillation of the first scanning mirror 118 causes the beams of light 108, 110, 112 to be moved. That is, as the angular position of the first scanning mirror 118 alters, so to does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
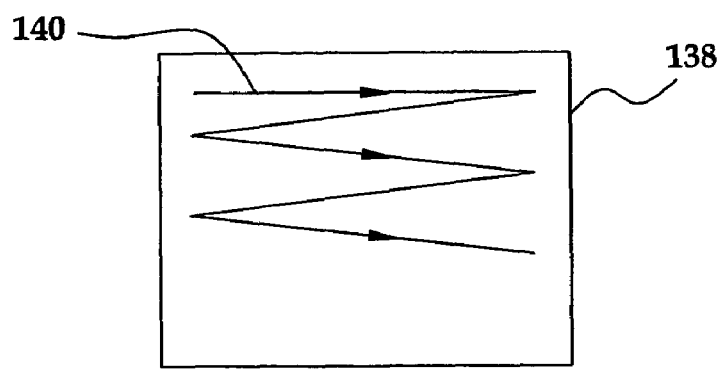
FIG. 2 is a stylistic view of a viewing surface shown in FIG. 1.

The second mirror 126 oscillates or rotates at a relatively slow rate, as compared to the rate of the first mirror 118 (e.g., about 60 Hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118), each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
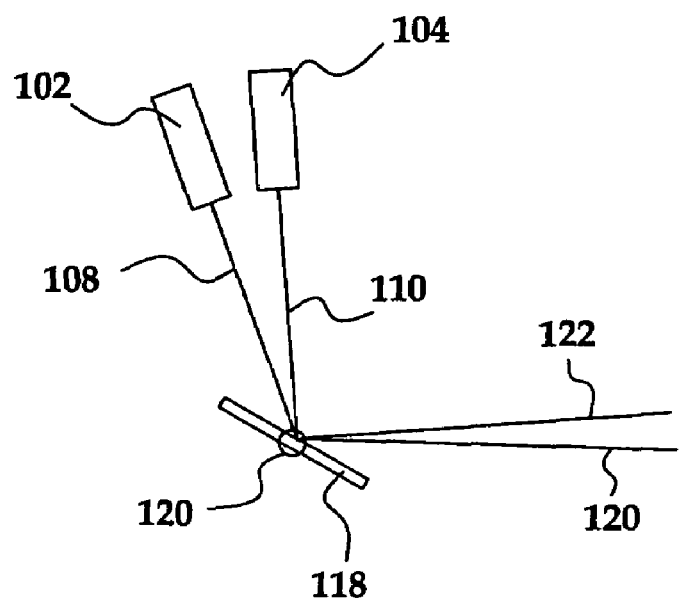
FIGS. 3A and 3B depict a top view of a scanning device at various times during its operation.
Figure 3B:
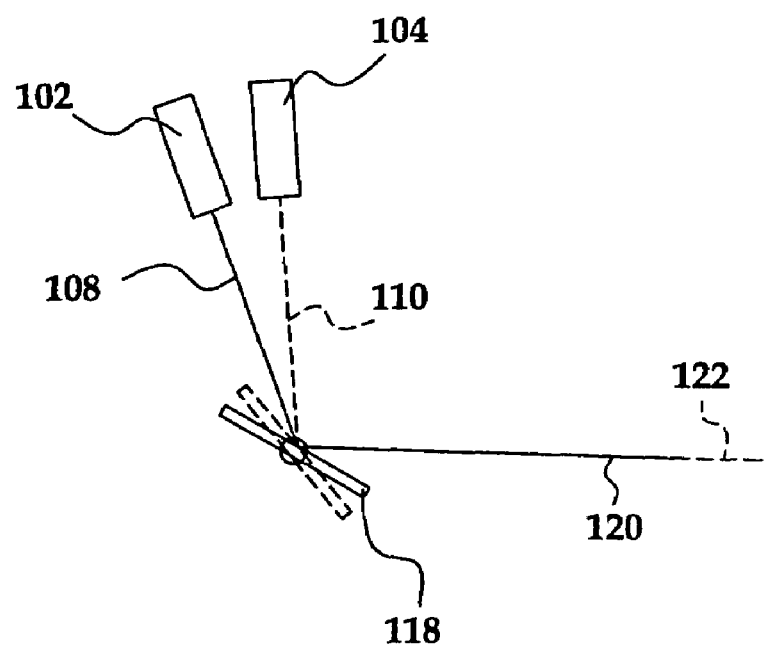

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138.

Returning to FIG. 1, a photodetector 144 is arranged to receive laser light reflected from the viewing surface 138. The photodetector 144 may take any of a variety of forms, including a single photosensitive element or a plurality of photosensitive elements arranged in a grid. In some embodiments, it may be useful to include a mechanical/optical system 146 to focus the reflected laser light onto the photodetector 144.

The photodetector 144 is coupled to the controller 142 via a line 148. Signals indicative of the magnitude of the reflected laser light detected by the photodetector 144 may be communicated to the controller 142 over the line 148. In some instances, such as when the photodetector 144 is composed of a grid or an array of photosensitive elements, it may be useful to also convey information regarding the location of the reflected laser light. As discussed in more detail in conjunction with FIG. 4, the controller 142 may use the information regarding the magnitude of the reflected laser light to generally determine conditions associated with the transmission path of the lasers, such as the reflectivity of the viewing surface, whether the laser light has been interrupted by a person or object, or the viewing surface being altered. If such an event is detected, the operation of the lasers may be modified, as desired.

1. Equalization of Vertical Spacing of Horizontal Scan Lines

Figure 4:
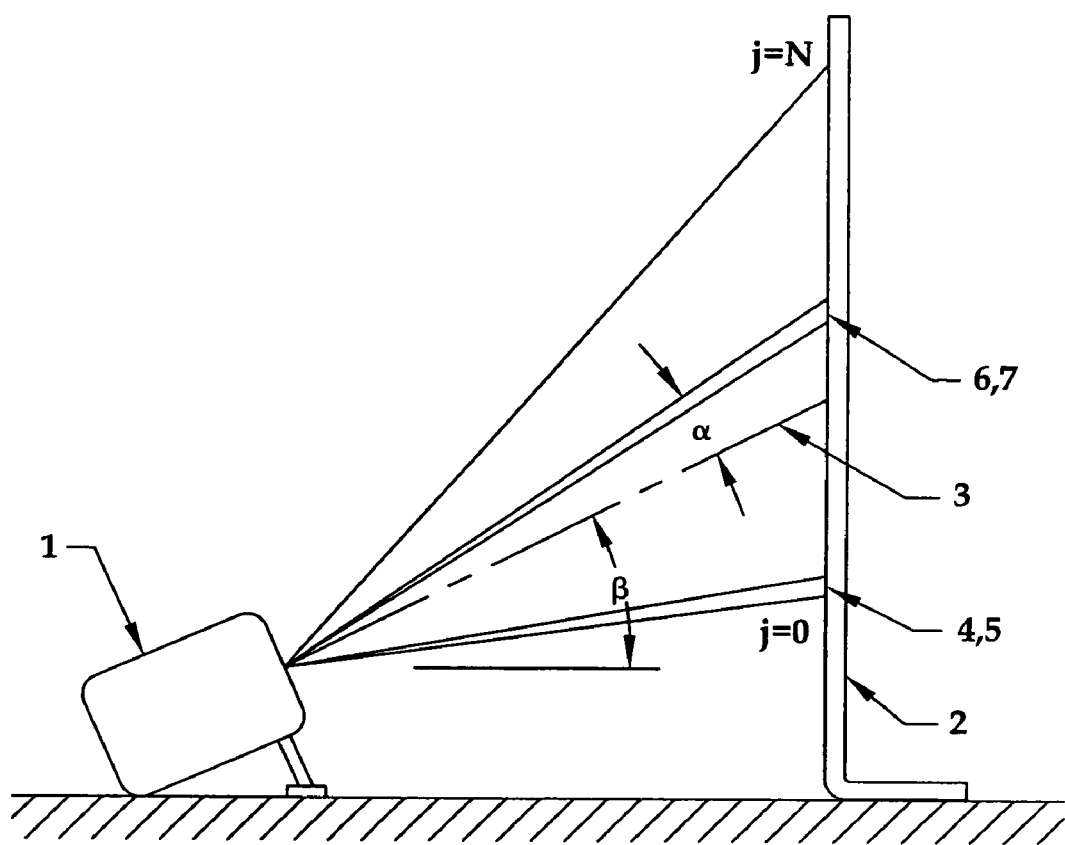
FIG. 4 depicts a side view of an LPD arranged to project an image on a viewing surface at an angle skewed from normal.

A miniature LPD display may be used in an orientation where the LPD projector is projecting up at an angle, as shown in FIG. 4. The LPD projector 1 is angled so that the centerline of its vertical scan 3 is not perfectly normal to a vertical screen 2. If the vertical scan rate is uniform in terms of each horizontal line being spaced at a constant vertical angle from the next horizontal line, then an upper pair of horizontal lines 6 and 7 will be spaced further apart on the screen than a lower pair of horizontal lines 4 and 5.

Because the vertical-scanning mirror on the LPD can be controlled in a way where its angular displacement verses time is non-linear, the mirror angle verses time can be controlled so that all horizontal lines on the screen are spaced the same vertical distance apart.

If the tilt angle $\beta$ of the LPD is known, and there are N horizontal lines to be painted onto the screen, and the maximum vertical optical displacement of the LPD is ±0, then the desired vertical optical displacement angle $\alpha$ of the LPD to yield perfectly uniform horizontal line spacing is given by:

$$\alpha_j = a\tan\left[(1-j/N)\tan(\beta-\alpha)+(j/N)\tan(\beta+\theta)\right]-\beta$$

where j=0 for the lowest horizontal line and j=N for the topmost horizontal line. This relationship follows from the geometry of the vertical scan shown in FIG. 4.

In the situation shown in FIG. 4, there will also be a variation in the length of each horizontal line from the lowest horizontal scan line to the topmost line, because of the variation in distance between the screen and the LPD as the scan moves vertically. However, the horizontal scan length can be adjusted electronically by controlling the timing of the production of each pixel, so that the final result is a display where all pixels are evenly spaced in the vertical and horizontal directions.

2. Screen Tilt Sensor for Vertical Spacing Adjustment

A miniature LPD can be used with a vertical line spacing equalization scheme like the one described in section 1. The user of the device can adjust the β angle parameter manually, inputting a value for this parameter using the user interface for the LPD. However, the LPD shown in FIG. 4 can have a built-in sensor for detecting its tilt angle. The sensor can work by detecting the position of an adjustment leg, such as the one pictured on LPD 1 in FIG. 4, or by detecting the orientation between the unit and the direction of gravity. In this way the β angle parameter inside the unit's software can be adjusted automatically as the user of the unit adjusts the tilt of the unit.

In an embodiment where the screen tilts instead of, or in addition to, the LPD projector, a sensor that detects the angle of the screen can be used to provide automatic adjustment of the β angle parameter.

3. Optical Screen Distance Detection

A miniature LPD can be used with a vertical line spacing equalization scheme like the one described in section 1. It is possible to sense the screen angle optically, to make internal adjustments for the tilt between the LPD projection centerline and a vector normal to the screen. Optical detection of this angle can be based on the principle that different points on the screen are located at different distances from the LPD. A test pattern can be projected during a self-adjustment mode of the unit. During the projection of the test pattern, electronics in the unit can be used to detect the power of the light reflected from the screen at any time during the painting of the image on the screen. The returning light power variations can be correlated to distance variations between the screen and the LPD. The relationship between these distance variations and position can be used to infer the angle between the LPD and the screen.

Alternatively, a single photoreceiver may be deployed to receive reflections from the viewing surface. The LPD can be configured to monitor the intensity of the received signal and deduce from it the angle between the screen and the LPD projection direction. The correlation between reflected intensity and the angle between the screen and the LPD may be recorded in a look-up table which the LPD may access using two parameters: the known intensity of the optical signal and the monitored intensity of the reflected signal. In some instances it may be useful to repeat the process for a plurality of locations within the projection field of the LPD. When this angle is determined, a correction can then be applied, as discussed above.

Figure 5:
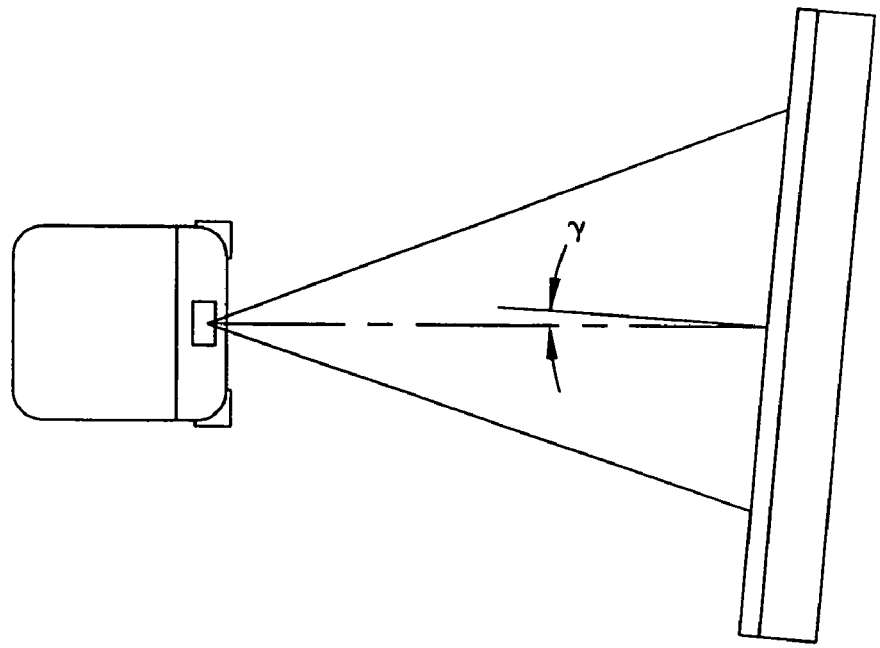
FIG. 5 depicts a top view of an LPD arranged to project an image on a viewing surface at an angle skewed from normal.

This self-adjustment scheme can be used for detecting both the vertical tilt between the screen and the LPD, as shown in FIG. 4, in addition to the horizontal tilt between the screen and the LPD, angle γ in FIG. 5. FIG. 5 shows a top-view of a projection situation in which there is a horizontal misalignment between the centerline of projection and a normal to the projection screen.

4. Horizontal Corrections to Pixel Width for Angled Screen

In a miniature LPD projection system, there is the ability to make a variety of corrections to the horizontal distribution of pixels on a projection screen. In section 1, there is a description of a correction to the horizontal scan length variation that would result from a vertical tilt between the LPD unit and a vector normal to the screen. In addition to this correction, the spacing between individual horizontal pixels can be adjusted so that the pixels are all of uniform width, in a way analogous to the way that the spacing between vertical scan lines can be adjusted to be uniform. If angle γ in FIG. 5 is known, where FIG. 5 is a top view of a projection situation, then the horizontal scan angles subtending individual equal-width pixels can be calculated, and the timing of the light supplied for each pixel can be coordinated to correspond to the position of the horizontal scan mirror in such a way as to produce those equal-width pixels on the screen.

5. Keystone Distortion Correction

The distortion of an image commonly referred to as "keystone" distortion results from vertical or horizontal misalignment between a projection system centerline and a vector normal to a screen surface. These are the same misalignments referred to in sections 1-4. Since it is possible to make use of the infinitely variable nature of the LPD display's vertical line spacing and horizontal pixel timing to correct for the non-uniformities resulting from these misalignments, it follows that it is possible to correct any type of keystone distortion in an LPD projected image. In addition, it is possible to correct these distortions without loss of resolution, since only the spacing between vertical lines or horizontal pixels is varied, not the number of vertical lines or horizontal pixels. The corrections for the keystoning effect are substantially identical to those discussed above in conjunction with FIGS. 1 and 2.

6. Vertical Spacing Adjustment Simplification for Fixed Screen

There is a simplified embodiment of the vertical line spacing equalization described in section 1: If there exists a fixed relationship between an LPD projector and its screen, so that angle β is constant by design, then the results of the vertical line spacing equalization equation can be stored as a permanent look-up table in the LPD unit, so that the correct vertical scan mirror angle verses time can always be easily outputted. Similarly, any necessary corrections in horizontal scan width to complete the elimination of keystone distortion can be stored in a permanent look-up table of horizontal pixel timing verses vertical scan position.

7. Tiled LPD Displays

Multiple miniature LPDs can be used to create a tiled image. FIG. 6 shows one possible embodiment where four LPDs 1, 2, 3, and 4 are mounted on stand 5 to project four images on screen 6. The four images can be viewed in rear projection mode on the opposite side of screen 6. The infinitely adjustable nature of the horizontal and vertical position of LPD images leads to the ability to adjust the tiling between these multiple images so that the edges of the images are precisely aligned.

Other embodiments could include only two LPDs or any number greater than 2, and the LPDs can be arranged to create tiled images for front-projection viewing or for rear-projection viewing.

8. Changing Aspect Ratios without Letterbox or Loss of Resolution

A miniature LPD can be used to create rectangular images with different aspect ratios (width: height) without a loss of resolution and without the need for screen areas that are projected but which are not used (as in the production of "letterbox" anamorphic widescreen 2.40:1 images on a standard 1.33:1 television).

As an example, FIG. 7(a) shows a 3-pixel-wide by 5-pixel-high image projected by an LPD display. The same LPD display can then switch to a mode, shown in FIG. 7(b), where a 4-pixel-wide by 3-pixel-high image is projected. The LPD horizontal scan mirror and vertical scan mirror amplitudes are infinitely adjustable, and the timing of the LPD pixel lasers can be under software control, so that any combination of horizontal width, vertical height, horizontal pixel resolution, and vertical scan spacing can be selected. The only limitations on one LPD for creating images with different aspect ratios are the maximum optical angles achievable by the scanning mirrors, the minimum time resolution (clock speed) of the system controlling the pixel lasers, and the limits of acceptability for the refresh rate of the display. Within these limitations, it is possible to display Academy (1.33:1) ratio images and to switch to anamorphic (2.40:1) ratio images without loosing horizontal pixel resolution; in addition, any other ratio can be displayed, including square images and high, narrow images.

9. Reducing Image Size for Brighter Images at Far Distances

A miniature LPD display can be used to project images that remain in-focus over an essentially infinite depth of field because of the constant divergence of the laser beams being used to create the image. However, an image created by an LPD display may suffer from lack of brightness if projected sufficiently far away. In this case, it may be desirable to create a smaller, brighter image without moving the LPD closer to the screen, especially if there are limitations regarding where the LPD can be located with respect to the screen.

FIG. 8(a) shows the pixels of a hypothetical 5-pixel-wide by 4-pixel high image projected far away by an LPD. To increase the brightness of the image without moving the LPD relative to the screen, the horizontal and vertical scan amplitudes can be reduced to shrink the image to the size shown in FIG. 8(b). If this change in scan amplitudes is made without a change in the optical power provided to each pixel, then the brightness of the 5(b) image will increase in proportion to its area reduction relative to the 5(a) image.

In other embodiments, the same size reduction can be made to an image of any number of pixels in length and width.

10. Using Optical Element to Reduce Image Size for Brighter Images

An image created by an LPD display may suffer from lack of brightness if projected sufficiently far away. In this case, it may be desirable to create a smaller, brighter image without moving the LPD closer to the screen, especially if there are limitations to where the LPD can be located with respect to the screen.

FIG. 9(a) shows a situation where an image 2 is projected far away by LPD projector 1. In FIG. 9(b), an optical element 4 has been placed between LPD 3 and the projected image 5. This optical element interacts with the scanning laser beams from the LPD to reduce the size of the projected image, subsequently increasing the brightness of the image without moving the LPD closer to the screen.

It would be possible to have embodiments where optical element 4 is completely passive and non-adjustable, achieving a fixed reduction in image size at a given distance. In another embodiment, optical element 4 can have adjustments for controlling the ratio of the size reduction.

11. Using Axicon Element to Increase Depth of Focus of Projected Image

A miniature LPD can achieve essentially infinite depth-of-focus past a certain distance from the LPD by matching the divergence of the LPD Gaussian laser beam profiles to the divergence of the vertical scan spacing and horizontal pixel spacing over distance. However, there will always be a region close to the waist of the Gaussian beam profiles where this divergence matching is no longer accurate, due to the diffraction-limited waist size of Gaussian laser beams.

A conical refractive axicon has already been shown to successfully create a non-diverging beam whose profile size is proportional to the square of a Bessel function. This non-Gaussian beam has a high percentage of energy in the center of the beam over a larger range of distances than a Gaussian beam. If this axicon is incorporated into an LPD system, then the projected image can contain in-focus pixels over a longer range of distances. In addition, the narrower power distribution of the axicon-generated beams will make it possible to increase the vertical and horizontal resolutions of the LPD display.

12. Projecting Onto Semitransparent Screens for Layered Images

A miniature LPD can be used to display information on screens located at multiple distances simultaneously, because the infinite depth-of-focus of the display allows the images to be in focus on each screen.

Figure 10:
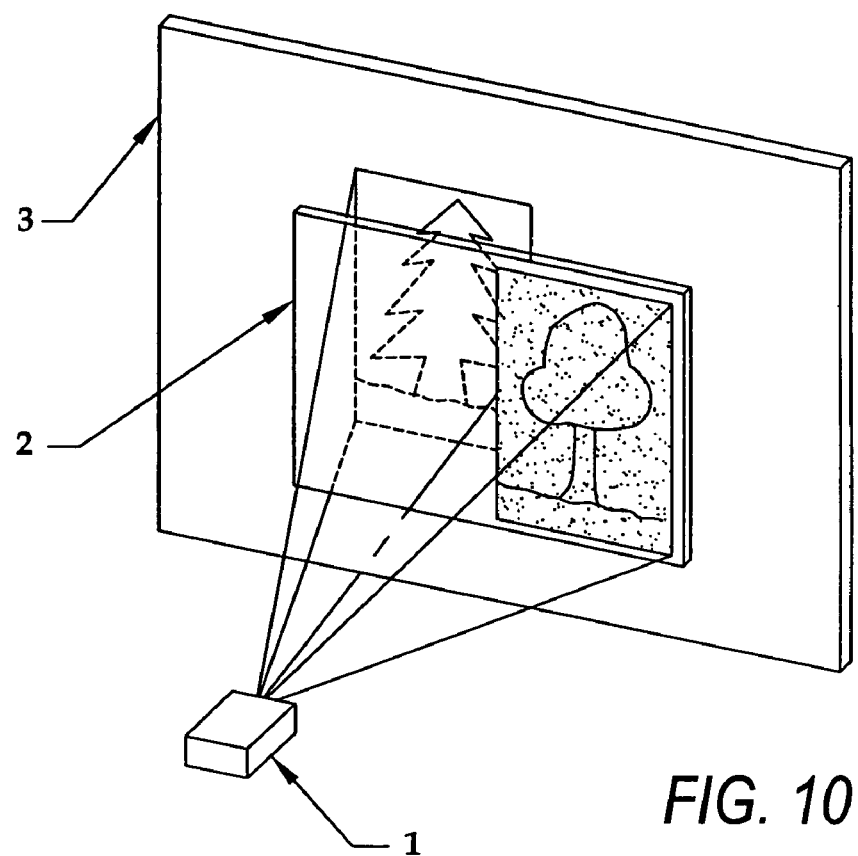
FIG. 10 depicts one embodiment of a multi-layered viewing surface.

In one embodiment, as shown in FIG. 10, an LPD projector 1 projects onto a glass screen 2 which is transparent on its left half and ground on its right half and which is placed in front of a conventional screen 3. When viewed from the front, the right half of the image from the LPD projector will appear on the ground half of the close screen while the left half of the image from the display will appear on the far screen as shown. This will create a layered effect for the viewer, where one image appears to float in front of another.

Figure 11:
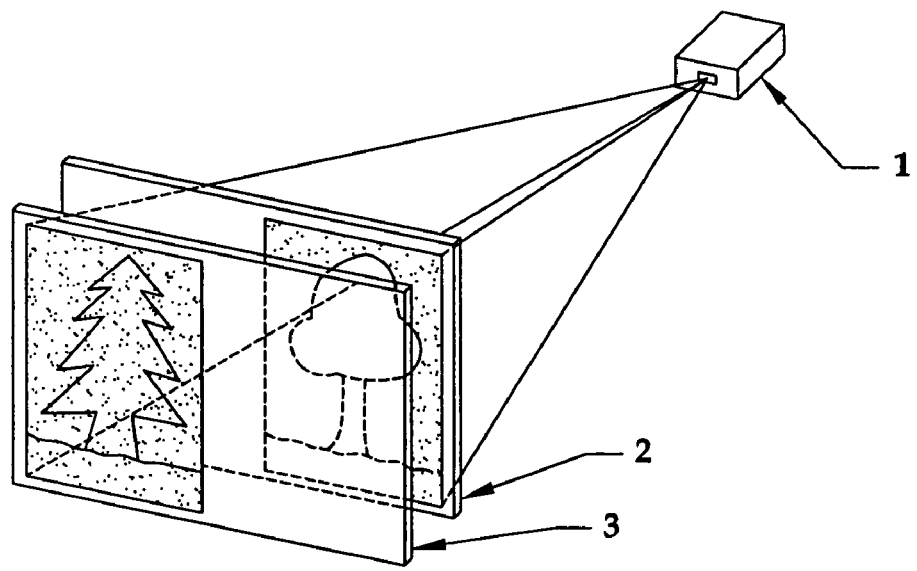
FIG. 11 depicts an alternative embodiment of a multi-layered viewing surface.

In another embodiment, the LPD can project onto the transparent/ground screens from behind. As shown in FIG. 11, an LPD 1 can project from the rear onto one glass screen 2 which is transparent on its left half and ground on its right half. In front of that screen, from the viewers point of view, can be placed a second glass screen 3 which is transparent on its right half and ground on it left half. The viewer will then see one image through the right side of the front screen formed on the left side of the far screen, as well as an image formed on the left side of the front screen which is projected through the left side of the rear screen. This will again create a layered effect for the viewer, where one image appears to float in front of another.

In other embodiments, three or more screens with selective transparency can be used to create three or more floating layers for the viewer.

13. Projecting Images onto Non-Flat Surfaces

A miniature LPD display can be used to project an image onto an irregularly shaped surface. Because of the infinite depth-of-focus of the display, the images created on the surface will be in focus everywhere on the surface, regardless of the distance of any point on the surface from the projector and regardless of the angle between a normal to any point and the direction of projection. In this way an in-focus image can be "painted" over the entire irregular surface, allowing the entire surface to serve as a screen, as compared with a conventional flat screen.

In one embodiment, shown in FIG. 12(a) an LPD display can be projected onto the curved surface of a balloon without loss of focus anywhere on the curved shape of the surface.

In a second embodiment, shown in FIG. 12(b), an LPD display can be projected onto a triptych without loss of focus on any of the three panels of the triptych.

14. Creating 3D Images on a Revolving Screen

A miniature LPD display can be used to project an image onto a screen (or screens) which revolve around an axis that is perpendicular to the direction of projection. As shown in FIG. 13, when the screen 2 revolves, points on the screen surface have constantly varying distances from the LPD projector 1. However, because of the infinite depth of focus of the LPD, images projected onto the screen surface will remain in focus throughout the range of distances occupied by the screen.

When the position of the screen is sensed or controlled by the projector itself, the display of an image can be coordinated in time to correspond to an instant when a particular pixel of the displayed image will appear at a particular distance from the LPD on the revolving screen surface. With a rapidly revolving screen, and a suitably fast display frame rate, various 3D display effects can be achieved.

In one embodiment, a rapidly rotating four-panel screen (similar in geometry to a revolving door) can be used to create images that move backwards and forward in space from the point of view of an observer.

In another embodiment, the same rotating four-panel screen can be used to display and image which is split into various depths, by displaying different images at times when the screen occupies different distances from the LPD. This will create pseudo-3D images from the point of view of an observer.

15. Projecting an Image on the Interior of a Balloon Through a Nozzle

As described in section 13, a miniature LPD display can be used to project onto an irregular surface. In one embodiment of the instant invention, an LPD may be arranged to project onto an interior surface an inflatable balloon made out of a material suitable for rear projection. As shown in FIG. 14, the LPD display can be incorporated into a device that inflates the balloon. LPD projector 1 consists of a nozzle 2 for inflating the balloon 3. The LPD unit projects an image 4 through the nozzle which can then be viewed as a rear-projection image that appears on the surface of the balloon.

16. Inflatable or Collapsible Screens for Portability

A miniature LPD display can work in conjunction with an inflatable or collapsible screen, or with a screen with an inflatable frame, to allow the screen to be as portable as the miniature LPD. FIG. 15 shows these designs: FIG. 15(a) illustrates a free-standing inflatable screen, FIG. 15(b) illustrates a collapsible screen with self-expanding spring-wire rim, and FIG. 15(c) illustrates an inflatable screen with a pressurized rim.

17. Inflatable Screen with Pump

An inflatable display for an LPD, as described in section 16, can be furnished with an electric pump or miniature hand pump for facilitating quick inflation of the screen.

18. Correction of Image Distortion on Non-Flat Screen Surfaces

As described in section 13, a miniature LPD projector is ideally suited for projecting images onto non-flat surfaces. A device incorporating an LPD can have a screen that is concave from the point-of-view of the user, to facilitate private use of the display, ease of viewing, rejection of ambient light, and a sensation of immersion into the images. Alternatively, a miniature LPD can project onto a screen that is convex from the point-of-view of the user, to facilitate shared viewing with other users.

In either case, the electronics and software of the LPD can be used of to adjust the position of pixels and spacing of vertical scan lines to restore uniform spacing between pixels. In the case of screen surfaces that distort horizontal scan lines, image processing can be relied on in conjunction with pixel timing and vertical scan re-spacing to correct distortion caused by projection onto the non-flat screen surface. Such corrections can be accomplished where the screen is of a known configuration by use of a look-up table or equation. Alternatively, as discussed below, the LPD can automatically accommodate "unknown" shapes by sensing the position and configuration of the screen using optical, ultrasonic or other known sensing techniques, as discussed above, for example, in conjunction with sections 1-4.

19. Adjustable Convex/Concave Screen with Shape Sensor

Figure 16A:
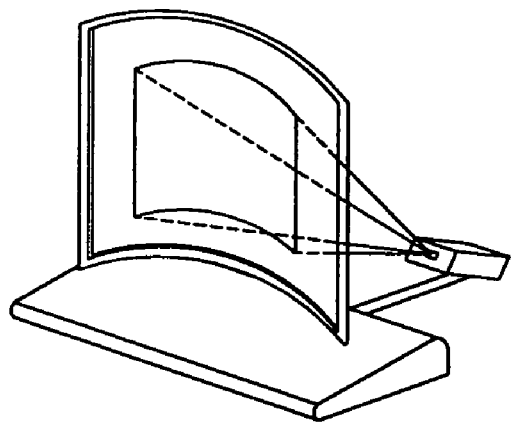
FIGS. 16A-16B depict alternative embodiments of a variable shaped viewing surface.
Figure 16B:
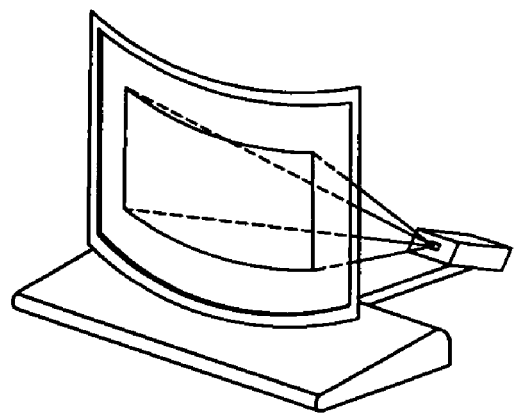

An additional embodiment of the idea in section 13 is a screen that can be adjusted by the user from a concave shape, through a flat shape, to a convex shape. FIG. 16(a) shows a rear-projection version with a concave display. In FIG. 16(b), the same screen has been adjusted by the user into a convex shape. There can also be front-projection embodiments with the same type of screen.

A stress sensor or sensors in the screen frame can be used to enable automatic adjustment of the LPD projection when the shape of the screen is changed. Alternatively, switches, contacts, or proximity sensors can be used to detect changes in screen configuration. It is also possible to use the optical detection of screen distance described in section 3 as the means for automatically sensing and adjusting the projection parameters as the user adjusts the screen shape.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An arrangement for projecting an image, comprising:
    a) a laser source for generating a laser beam;
    b) a scanner for sweeping the laser beam over a first scan angle to form a scan line having pixels arranged along a first direction, and for sweeping the scan line over a second scan angle along a second direction orthogonal to the first direction to project a raster pattern of scan lines on a projection surface;
    c) a detector for detecting a change in a shape and orientation of the projection surface; and
    d) a controller for energizing the laser source to generate the laser beam and illuminate selected pixels on the scan lines to form the image with two dimensions on the projection surface, and for controlling the scanner to vary at least one of the scan angles to change at least one of the dimensions of the image on the projection surface upon detection of the changed shape and orientation of the projection surface.

2. The arrangement of claim 1, wherein the controller is operative for varying both of the scan angles to change an aspect ratio of the image.

3. The arrangement of claim 1, wherein the controller is operative for reducing both of the scan angles to reduce the dimensions of the image and increase image brightness.

4. The arrangement of claim 1, wherein the scanner includes a first scan mirror oscillatable over the first scan angle, and a second scan mirror oscillatable over the second scan angle.

5. The arrangement of claim 1, wherein the scan lines have different lengths as measured along the first direction due to different distances traveled by the laser beam from the scanner to the projection surface, and wherein the controller is operative for varying the at least one scan angle to change the lengths of the scan lines.

6. The arrangement of claim 1, wherein the controller is operative for non-linearly varying both of the scan angles to provide uniform spacing between the scan lines and uniform spacing between the pixels on each of the scan lines.

7. The arrangement of claim 2, wherein the projection surface is deformable to a non-planar shape.

8. A method of projecting an image, comprising the steps of:
    a) generating a laser beam with a laser source;
    b) sweeping the laser beam over a first scan angle to form a scan line having pixels arranged along a first direction, and sweeping the scan line over a second scan angle along a second direction orthogonal to the first direction to project a raster pattern of scan lines on a projection surface;
    c) detecting a change in a shape and orientation of the projection surface; and
    d) energizing the laser source to generate the laser beam and illuminate selected pixels on the scan lines to form the image with two dimensions on the projection surface, and varying at least one of the scan angles to change at least one of the dimensions of the image on the projection surface upon detection of the changed shape and orientation of the projection surface.

9. The method of claim 8, wherein the varying step is performed by varying both of the scan angles to change an aspect ratio of the image.

10. The method of claim 8, wherein the varying step is performed by reducing both of the scan angles to reduce the dimensions of the image and increase image brightness.

11. The method of claim 8, wherein the sweeping step is performed by oscillating a first scan mirror over the first scan angle, and by oscillating a second scan mirror over the second scan angle.

12. The method of claim 8, wherein the scan lines have different lengths as measured along the first direction due to different distances traveled by the laser beam to the projection surface, and wherein the varying step includes varying the at least one scan angle to change the lengths of the scan lines.

13. The method of claim 8, wherein the varying step includes non-linearly varying both of the scan angles to provide uniform spacing between the scan lines and uniform spacing between the pixels on each of the scan lines.

14. The method of claim 8, and deforming the projection surface to a non-planar shape.

* * * * *